(12) United States Patent
Burris et al.

(10) Patent No.: US 8,171,965 B2
(45) Date of Patent: May 8, 2012

(54) FUEL LEAK PREVENTION SYSTEM

(75) Inventors: Steven Y. Burris, Charleston, SC (US); David Michael Strickland, Moncks Corner, SC (US); Wilson A. Jones, Hanahan, SC (US)

(73) Assignee: Strictly Green, LLC, North Charleston, SC (US)

( * ) Notice: Subject to any disclaimer, the term of this patent is extended or adjusted under 35 U.S.C. 154(b) by 297 days.

(21) Appl. No.: 12/580,678

(22) Filed: Oct. 16, 2009

(65) Prior Publication Data

US 2010/0096038 A1   Apr. 22, 2010

Related U.S. Application Data

(60) Provisional application No. 61/106,195, filed on Oct. 17, 2008.

(51) Int. Cl.
*B65B 1/04* (2006.01)
(52) U.S. Cl. ............... 141/311 A; 141/392; 222/108
(58) Field of Classification Search .............. 141/206, 141/311 A, 392; 222/108
See application file for complete search history.

(56) References Cited

U.S. PATENT DOCUMENTS

| | | | |
|---|---|---|---|
| 4,214,614 A * | 7/1980 | Pyle | 141/1 |
| 4,919,305 A | 4/1990 | Podgers | |
| 5,377,729 A * | 1/1995 | Reep | 141/392 |
| 5,390,712 A | 2/1995 | Parrish et al. | |
| 5,603,364 A * | 2/1997 | Kerssies | 141/392 |
| 5,620,032 A * | 4/1997 | Dame | 141/311 A |
| 6,810,920 B1 * | 11/2004 | Rolling | 141/1 |
| 7,270,154 B2 * | 9/2007 | Walker et al. | 141/59 |
| 7,607,459 B2 * | 10/2009 | Treen, Jr. | 141/311 A |

FOREIGN PATENT DOCUMENTS

JP   50-107516 A   8/1975

OTHER PUBLICATIONS

Korean International Search Report and Written Opinion dated Jun. 22, 2010 for related PCT Application No. PCT/US2009/061048.

* cited by examiner

*Primary Examiner* — Timothy L Maust
(74) *Attorney, Agent, or Firm* — Ryan A. Schneider, Esq.; Benjamin C. Wiles, Esq.; Troutman Sanders LLP (57) ABSTRACT

A fuel leak prevention system and method for providing same includes a check valve for insertion into the discharge end of a spout assembly of a fuel dispensing nozzle, the check valve being located downstream of the nozzle's fuel control valve so as to prevent any leaking or dripping of fuel from the spout when the nozzle is deactivated. The check valve includes a pivoting flap that is preferably spring-loaded and predisposed to remain closed to seal the spout when there is no fuel flowing through the nozzle, but which is allowed to rotate within the spout to open the nozzle and allow the flow of fuel when the nozzle is activated. The system and method disclosed has application to any liquids that are to be dispensed, including petrol, diesel, kerosene, gas oil, gas, liquid petroleum gas, av-gas, chemicals, and water.

20 Claims, 8 Drawing Sheets

FUEL LEAK PREVENTION SYSTEM

CROSS REFERENCE TO RELATED APPLICATION

This application claims benefit under 35 USC §119(e) of U.S. Provisional Patent Application Ser. No. 61/106,195 filed 17 Oct. 2008, which application is hereby incorporated fully by reference.

BACKGROUND OF THE INVENTION

1. Field of the Invention

Embodiments of the present invention relate generally to a fuel leak prevention system, and more particularly to a system to prevent fuel from leaking or dripping from the dispensing end of a fuel nozzle after the nozzle has been deactivated.

2. Description of Related Art

Fuel dispensing nozzles of the general type used on fuel pumps in fueling stations are well understood in the art. These nozzles are normally provided with hold-open catches for holding an operating lever in an open position, and are provided with an automatic shut-off means for shutting off the flow of fuel from the nozzle when the tank level reaches the discharge end of the nozzle. The hold-open catch feature and the automatic shut-off means allow the operator to leave the nozzle unattended during the filling operation without fear that the tank will overflow should it become full while the nozzle is unattended.

The fuel nozzle generally works off of pressure created by the flow of fuel from the pump. When the hold-open latch is engaged, the poppet valve stem is open, allowing fuel to flow. As the fuel flows, the anti-drain valve in the spout is open, which sucks air into a vacuum chamber above the poppet valve.

As long as the vacuum chamber is in equilibrium with the atmospheric pressure beneath the diaphragm of the chamber, the poppet is engaged, and the flow of fuel will continue. When either the hold-open latch is disengaged, or when the anti-drain valve is covered by fuel (full tank) air intake ceases, and the poppet valve stem closes, disrupting the flow of fuel.

Since the point of closure is in the handle of the nozzle, there is an area between the poppet and the end of the spout where fuel may remain after fueling. Depending on the length, the diameter, and the curvature of the spout, the fuel retained in this area can vary from a few drops to several ounces. Thus, fueling nozzles retain fluid between the shut-off mechanism and the end of the spout.

This uncontained fuel can be spilled on the car, ground, or on the body, creating a fire, clean-up, and environmental hazard. In such a nozzle, it is sometimes desirable to provide for a shut-off valve at the tip of the nozzle spout and in the fuel supply passage to avoid drips from the spout after the nozzle is removed from the fill tube of a fuel tank of the motor vehicle, as there is ever increasing concern about damage to the environment resulting from the contamination of ground water and soil due to spillage of vehicle fuels, petroleum substances and other chemicals. Part of the damage is caused by the dripping of excess liquid from the nozzle used to dispense the fuel or liquid, after the nozzle has been deactivated. As described, in general, once the nozzle is deactivated, there remains a small amount of excess liquid in the nozzle. As the nozzle is removed from the fuel tank or container, the remaining liquid tends to drip from the dispensing end of the nozzle onto the surrounding ground surface or onto the user. In addition, part of the damage is caused by activation of the nozzle when the nozzle is removed from the container or fuel tank. Activation of a nozzle outside of a container or fuel tank also presents a safety problem due to the spillage of the flammable fuel.

Fueling stations rely on consumers to dispense fuel. A typical nozzle is handled hundreds of times a day. Spillage from the spout is normal. The wasted fuel may eventually enter a storm drain through run off and cleaning procedures. Fuel seeping into the ground contaminates soil, streams, rivers, lakes, and drinking water. For example, one quart of spilled fuel can contaminate 250,000 gallons of fresh drinking water. One pint of fuel seeping into a lake can create a one acre slick, preventing the replenishment of oxygen, blocking sunlight, and impairing photosynthetic processes.

Spilled fuel also releases Volatile Organic Compounds (VOC's) that have long and short term adverse health effects. VOC's are organic chemical compounds that have high enough vapor pressure under normal conditions to significantly vaporize and enter the atmosphere. These vapors contribute to air pollution and greenhouse gases.

The cost of fuel is also a consideration to retain spillage. At US$4.00 per gallon, one ounce of fuel costs US$0.03. Over many spills, this can amount to a large amount of fuel inventory lost. There is also, of course, the considerable inconvenience and potential safety hazards this problem poses to the consumer, including the risk of spillage or drippage onto clothes, shoes, or hands, not to mention the safety hazards posed by drippage of fuel onto the driveways at fueling stations.

To help prevent spillage of the liquid, a non-drip assembly is needed to prevent the excess liquid from dripping from the end of the nozzle once the nozzle has been deactivated. The related art has shown various apparatus for preventing a liquid dispensing nozzle from dripping liquid after the nozzle has been deactivated. Illustrative are U.S. Pat. No. 4,014,472 to Bennett; U.S. Pat. No. 4,213,488 to Pyle; and U.S. Pat. No. 5,377,729 to Reep.

Bennett describes a nozzle assembly for high speed filling units. The nozzle assembly includes an upper casing within which is mounted a nozzle piston structure. The piston structure is fastened to an inner, hollow sleeve member to move the sleeve member. The sleeve member is provided with openings adjacent the piston structure to allow for communication between the inner space of the hollow sleeve member and the cylinder space. The end of the inner sleeve member opposite the piston structure is provided with discharge openings and a plug-like end closure member. A spring mounted around the inner sleeve member acts to bias the sleeve into the closed position. An outer sleeve member is slidably mounted around the inner sleeve member and is fixably secured to the lower casing of the nozzle assembly. In operation, the pressure of the fluid causes the piston to open which in turn moves the inner sleeve member outward thus, moving the end of the inner sleeve member beyond the outer sleeve member which exposes the discharge openings. Once the flow of fluid stops, the spring biases the piston structure and the inner sleeve member into the closed position.

Pyle describes a valve located in the end of a nozzle for preventing the flow of fuel and fuel vapors out of the nozzle when the nozzle is deactivated. In one embodiment, a pinch valve is located at the end of the nozzle. The pinch valve comprises a resilient sleeve and is designed to open and close by the action of air or hydraulic pressure acting on the resilient sleeve. A fluid passageway is provided to establish communication between the pinch valve and the flow passage upstream of the flow control valve. When the nozzle is deactivated, the pinch valve is in fluid contact with the flow passage such that the pressure from the fluid flowing to the pinch valve acts to close the pinch valve. When the nozzle is activated, a passageway is formed between the fluid passageway and the flow passage downstream of the flow control valve such that the fluid flows out of the fluid passage and the pinch valve and out of the flow passage. In another embodiment, a wafer valve is mounted in the end of the nozzle and acts to seal the end of the nozzle. The wafer valve comprises two substantially semi-circular discs pivotally arranged around a shaft which extends from one side of the end of the nozzle to the other to support the discs. The wafer valve uses a similar construction as described above to open and close.

Reep describes a check valve device for a fuel pump nozzle. The device includes a stopper having a stem mounted on a plug member. The plug member is sized to close the dispensing end of the nozzle. A support member is mounted on the stem of the stopper to guide and support the stopper. The support member has two extension members mounted in an essentially U-shaped manner. The extensions engage the inside wall of the nozzle to hold the support member securely within the passage. The support member is shaped to allow the fuel to pass through the nozzle. A spring is mounted between the end of the stem opposite the plug member and the support member. The spring acts to bias the stopper back into engagement with the end of the nozzle. In operation, the plug member is seated within the end of the nozzle when fuel is not being dispensed. Once the fuel pump is activated, the fuel pressure on the plug member acts to move the plug member out of engagement with the end of the nozzle. Once the pump is deactivated, the force acting to disengage the plug member is less than the force of the spring acting to move the plug member back into engagement with the end of the nozzle. Consequently, the plug member acts to close the end of the nozzle such as to prevent the nozzle from dripping.

Also of some interest are U.S. Pat. No. 3,324,904 to Crotners; U.S. Pat. No. 4,749,010 to Petell; and U.S. Pat. No. 4,834,151; and U.S. Pat. No. 5,249,611 all to Law which show non-drip apparatus which are activated by removal of the nozzle from contact with the container.

Further, of interest are U.S. Pat. No. 2,936,799 to Mannon; U.S. Pat. No. 3,521,679 to Copony; U.S. Pat. No. 3,994,323 to Takahata et al. and U.S. Pat. No. 5,076,333 to Law which show the closing off of the venturi opening or the air vent tube in response to removal of the nozzle from the container or fuel tank which stops the flow of liquid in the nozzle.

There remains a need for a liquid dispensing nozzle that will not drip excess liquid once the nozzle is deactivated. What is needed is a system of isolating any remaining liquid between the poppet stem valve and the terminal end of the spout, in order to retain any remaining liquid in the nozzle, and eliminate leakage. It is to such a system that the present invention is primarily directed.

BRIEF SUMMARY OF THE INVENTION

Briefly described, in preferred form, the present invention is a fuel leak prevention system that comprises a check valve insert comprising a pivoting flap that is preferably spring-loaded and located at the dispensing end of the spout of a fuel dispensing nozzle. The check valve insert prevents the flow of fuel at the terminal end of the spout. By stopping the flow of fuel at the terminal end of the nozzle (as opposed to at a location interior to the nozzle, e.g., the poppet valve stem in the handle of the nozzle), there is no drippage of the fuel that remains in the spout after the nozzle has been deactivated. The check valve insert is positionable at the outlet end of the fuel dispensing nozzle. In one embodiment, the check valve can be inserted into the spout during fabrication of the nozzle. An alternate embodiment allows the retrofit of an existing nozzle by adding an extension that contains the check valve to the spout on the nozzle.

A fuel dispensing nozzle of the present invention generally includes an inlet for the fuel being pumped, a spout for dispensing of the fuel, a poppet valve between the inlet and outlet, and a handle that is operable to move the poppet valve between an opened position in which fuel can flow from the inlet to the spout and a closed position in which fuel is prevented from flowing from the inlet to the spout. The present invention also has application to any liquids that are to be dispensed, including petrol, diesel, kerosene, gas oil, gas, liquid petroleum gas, av-gas, chemicals, and water.

An isolation system is herein disclosed to isolate remaining fuel between the poppet stem valve and the terminal end of the spout by means of a flapper valve. The flapper valve is activated (opened) by the pressure created by the flow of fuel from the pump. When the flow stops, the valve closes, since the resistant pressure is not enough to maintain the valve in the open position. Consequently, remaining fuel in the nozzle is retained in the spout.

In an exemplary embodiment, the present invention is a leak prevention system for use with a liquid dispensing nozzle, the nozzle in fluid communication with a liquid dispensing pump, the system comprising a body portion, a spout assembly extending from the body portion, the spout assembly having an outlet end configured for dispensing the liquid, a flow control valve in the body portion operable to allow or prevent the flow of liquid through a flow passage defined by the body portion, and a check valve positioned within the spout and downstream of the flow control valve and being responsive to the flow of liquid through the body portion and into the spout assembly, wherein the check valve is biasedly disposed to remain closed when no liquid is flowing through the nozzle so as to prevent liquid from dripping from the outlet end when the nozzle is not activated. The check valve can be located in the vicinity of the outlet end of the spout. The check valve can comprise a flap member being pivotably attached within the spout, and a closing member mounted within the spout and oriented to engage the flap member to apply a continuous force to a rear face of the flap member, wherein the force applied by the closing member is large enough to cause an opposing face of the flap member to seat in the spout and remain seated when the nozzle is not activated, but the force is not so large to prevent the flap member from rotating to substantially open the spout and allow the flow of liquid when the nozzle is activated. The closing member can be a spring.

The present leak prevention system can further comprise a stop member positioned inside the spout and adapted to provide a seating area for the opposing face of the flap member and for preventing the flap member from rotating beyond a preset orientation. The present system can further comprise a hinge pin secured inside the outer end of the spout, wherein the flap member further comprises a tab located at an outer edge of the flap member, the tab having a bore through a longitudinal axis of the tab and configured to receive the hinge pin such that the flap member can rotate about the longitudinal axis, and wherein the spring member is also configured to receive the hinge pin such that the spring member is in constant communication with the flap member. The hinge pin can be fixedly attached to an inner wall of the spout, wherein the inner wall contains a groove adapted to receive an upper surface of the tab and at least a portion of the spring member such that the axis of rotation of the flap member is partially located within the inner wall to allow the flap member to rotate within the spout and fully seat against the stop member without interference from the inner wall.

The flap member of the system can be constructed, for example, of metal or an elastomeric material. The rear face of the flap member can further comprise a raised portion centrally located and configured to receive the closing member so as to distribute the closing member force across the flap member.

In another exemplary embodiment, the present invention can be a method for preventing leakage from an outlet end of a liquid dispensing nozzle, comprising providing a nozzle in fluid communication with a liquid dispensing pump, the nozzle including a body portion, a spout assembly extending from the body portion, and a flow control valve in the body portion operable to allow or prevent the flow of liquid through a flow passage defined by the body portion, wherein the spout assembly has an outlet end configured for dispensing the liquid, and providing a check valve positioned in the outer end of the spout and being responsive to the flow of liquid through the body portion and into the spout and being biasedly disposed to remain closed when no liquid is flowing through the nozzle so as to prevent liquid from dripping when the nozzle is not activated, the check valve comprising a flap member being pivotably attached within the outer end of the spout, and a closing member mounted within the outer end of the spout and oriented to engage the flap member by applying a continuous force to seat a rear face of the flap member when the nozzle is not activated, and to allow the flap member to rotate to substantially open the spout and allow the flow of liquid when the nozzle is activated.

These and other objects, features and advantages of the embodiments of the present invention will become more apparent upon reading the following specification in conjunction with the accompanying drawings.

The detailed description explains the exemplary embodiments of the invention, together with advantages and features, by way of example with reference to the drawings.

DETAILED DESCRIPTION OF PREFERRED EMBODIMENTS

Figure 1:
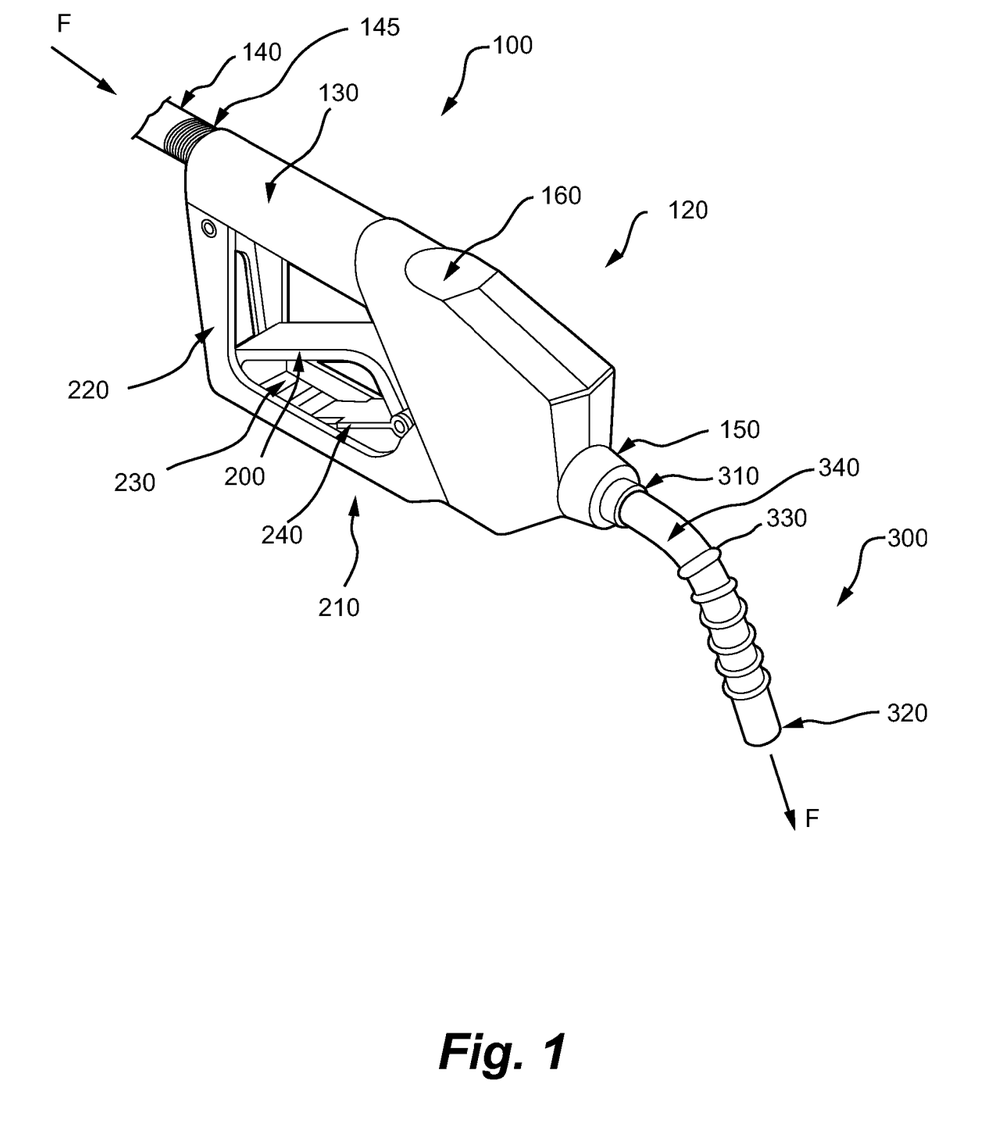
FIG. 1 illustrates a perspective view of a conventional fuel dispensing nozzle that can be adapted to incorporate a fuel leak prevention system in accordance with an embodiment of the present invention.

Referring now in detail to the drawings, wherein like reference numerals represent like parts throughout the several views, FIG. 1 illustrates a perspective view of a conventional fuel dispensing nozzle ("nozzle") 100 that can be adapted to accept a fuel leak prevention system 1000 (FIGS. 3B, 4-7) in accordance with an exemplary embodiment of the present invention. The nozzle 100 is well understood in the art, and will be generally described in more detail below.

Reference here is made to a fuel dispensing nozzle most commonly associated with a "fueling station" at which customers pump liquid fuel into their vehicles or into a storage container. For convenience, the term "fuel" (F) is used herein to describe the material to be dispensed via the nozzle 100. It is contemplated, however, that the nozzle 100 is capable of delivering liquid of any sort, for example petrol, gas oil, kerosene, diesel, liquid petroleum gas (LPG), gas, av-gas, chemicals, and water. As shown, the system of the present invention is designed to prevent fuel from leaking or dripping from the dispensing end of the nozzle after the nozzle has been deactivated.

There are likely thousands, if not millions of such fueling stations in the United States and worldwide, each of which already incorporates multiple nozzles of the sort described here. Thus, for example, in a typical fueling station (e.g., convenience store) there may be anywhere from four (4) to eight (8) individual dispensing pumps, each containing at least one (1) nozzle for the most commonly dispensed fuels (regular unleaded, mid-grade unleaded, premium unleaded, diesel). As new filling stations are constructed, or as filling station owners replace nozzles at existing filling stations, it is desirable to provide a fuel leak prevention system that can be incorporated directly into the manufacture of the nozzle. It is to such a need that a preferred embodiment of the present is directed. On the other hand, to the extent that the nozzles are already in place at existing filling stations, what is desired is a fuel leak prevention system that can be adapted to upgrade or refurbish an existing nozzle, so that the advantages of the present invention can be realized without necessitating the expense of replacing the entire nozzle. Thus, an alternate embodiment of the present invention is directed to fill this need.

Nozzle

The operation of a conventional nozzle 100 will now be explained by reference to FIGS. 1, 2A, 2B. The nozzle 100 generally comprises a body 120, which is in fluid communication with a fuel dispensing pump (not shown) that supplies fuel F into the body 120 via a hose 140; a main valve 160 positioned within the body 120 that provides control over the flow of fuel F through the body 120; a spout assembly 300 that is secured to the body 120 and is shaped to engage the mouth of a container (not shown) into which the nozzle 100 transfers fuel F; latch means 210 for selectively closing and prohibiting the opening of the main valve 160; and automatic shut-off means 400 for closing the main valve 160 when the fuel F reaches the discharge end 320 of the spout assembly 300.

Body

The body 120 defines an internal passageway through which the fuel F is dispensed from its source (as depicted here, the hose 140) into the spout assembly 300 (described below) and finally deposited into the mouth of a vehicle's fuel tank or a storage container (not shown). The passageway of the body 120 is provided with an inlet port 130, the exterior surface of which is typically shaped as a cylindrical body for ease of hand holding, and which is releasably connected in fluid communication to the dispensing pump, and an outlet port 150, which is connected to the inlet port 310 of the spout assembly 300.

The body 120 is further provided with a cap member 410 that is releasably mounted on the body 120, whereby the cap member 410 and the body 120 define an automatic shut-off chamber 480 that is in communication with and functions as part of the automatic shut-off means 400 (described below).

The body 120 further comprises a handle portion 220, which is adapted for attachment to the cylindrical exterior surface portion of the inlet port 130 to form a convenient handhold for the customer, and which encloses the operating lever 200 (described below) that the customer uses to control the operation of the nozzle 100.

The handle portion 220 may also optionally be fitted to accommodate a hold-open clip 240 that works in conjunction with the automatic shut-off means 400 (described below) to allow the operator to leave the nozzle 100 unattended during the filling operation without fear that the tank will overflow should it become full while the nozzle 100 is unattended. To accomplish this feature, the upper surface of the lower extremity of the handle portion 220 may optionally be fitted with a series of raised ridges or grooves (cut outs) 230 so as to accept the optional hold-open clip 240 that is pivotably attached to the operating lever 200.

Main Valve

The main valve 160 comprises a valve seat 430 adapted to be in communication with the latch means 210 (described below) through a valve stem 440 that is fixedly secured to the attached operating lever 200. The main valve 160 is mounted within the body 120 between the inlet port 130 and the outlet port 150 for selectively opening and closing the passageway to allow control of the flow of the fuel F from the hose 140 into the spout assembly 300. The main valve 160 is normally biased to a closed position such that the flow of fuel F is prevented from flowing unless and until the customer engages the latch means 210 (described below) by pressing the attached operating lever 200 to selectively open the main valve 160 to allow the flow of the fuel F through the body 120.

Spout Assembly

The spout assembly 300 is comprised of a spout 340, which includes an inlet section 310 secured to the outlet port 150 of the body 120, and an outlet section 320 opposite the inlet section 310 for dispensing and selectively directing the flow of the fuel F from the nozzle 100. The spout assembly 300 is configured to engage the mouth of a vehicle's fuel tank or a storage container (not shown) into which the nozzle 100 transfers fuel F.

Figure 2A:
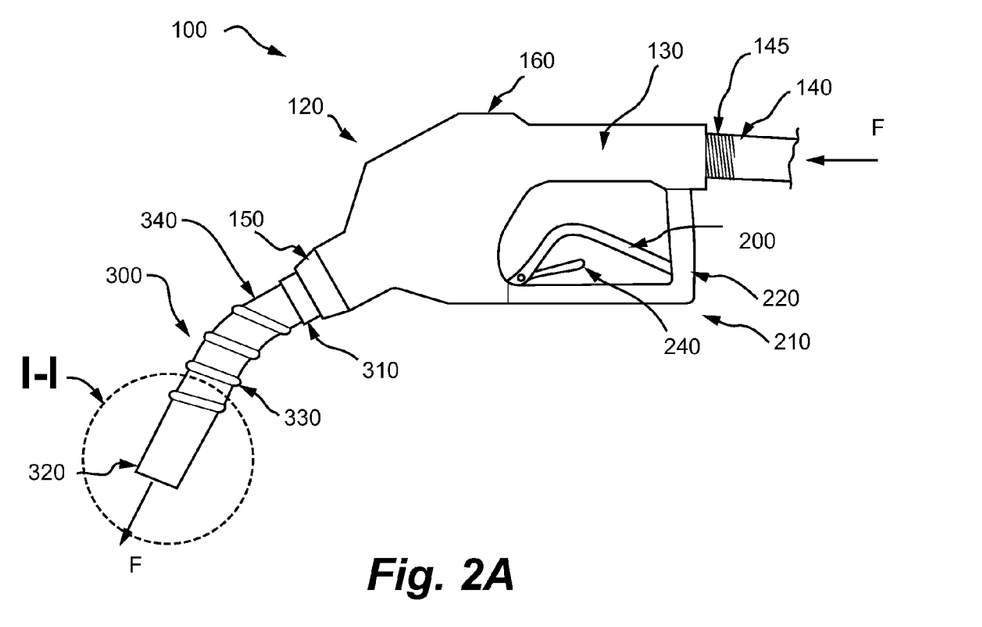
FIGS. 2A and 2B illustrate side and cross-sectional views, respectively, of a conventional fuel dispensing nozzle that can be adapted to incorporate a fuel leak prevention system in accordance with an embodiment of the present invention.

The spout 340 may optionally include coils 330 secured to its circumference in the manner shown as in FIG. 2A to help maintain the spout 340 in the fill tube of a vehicle particularly during unattended fueling as described earlier.

Latch Means

The latch means 210 comprises an operating lever 200, which may include the optional hold-open clip 240 as described above, the lever 200 being in communication with the main valve 160 through the attached valve stem 440 as described above for selectively closing and prohibiting the opening of the main valve 160 to allow control of the flow of fuel F. The latch means 210 is further pivotably attached to a plunger 450 for operation of the vacuum diaphragm 460 in connection with the automatic shut-off means 400 (described below) to allow closing the main valve 160 when the fuel F reaches the discharge end 320 of the spout assembly 300.

Automatic Shut-Off Means

Figure 2B:
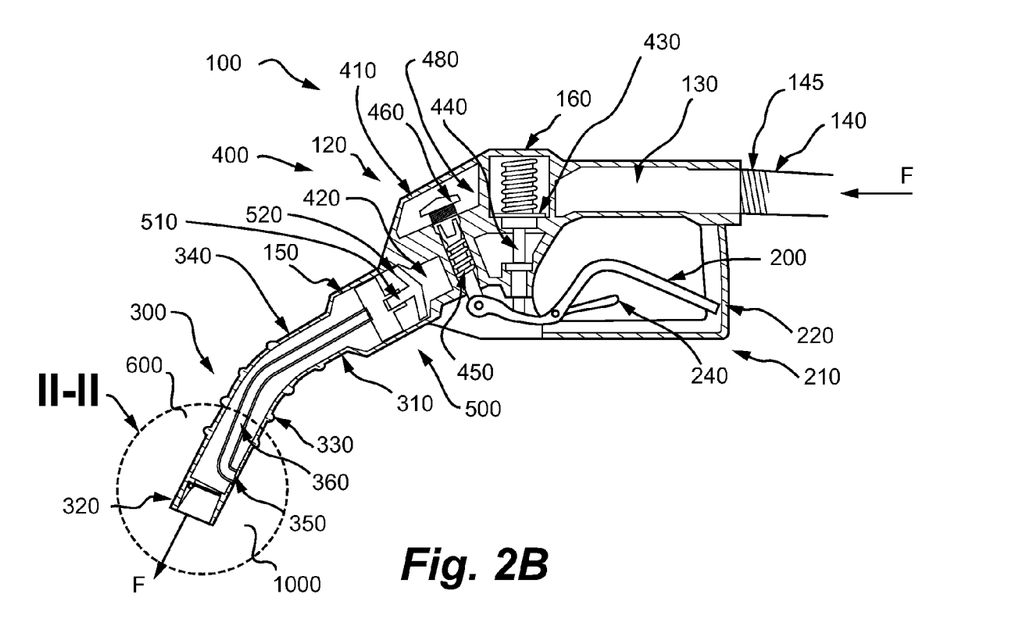

The automatic shut-off means 400 generally comprises a vacuum diaphragm 460 mounted between the cap member 410 and the body 120 transversely dividing the automatic shut-off chamber 480 so as to define a vacuum chamber 420 as depicted in FIG. 2B. The vacuum diaphragm 460 is secured to the latch means 210 by way of a plunger 450 such that preselected movement of the plunger 450 releases the latch means 210 so as to close and prohibit the opening of the main valve 160.

The automatic shut-off means 400 further comprises a poppet valve 500, which is provided with a poppet valve stem 510 that opens or closes a poppet valve seat 520 for generating a venturi effect in a well known manner; a vacuum conduit 530 for connecting in fluid communication the vacuum chamber 420 with the poppet valve seat 520; and an anti-drain valve assembly 600 for connecting in fluid communication the vacuum chamber 420 with the discharge end 320 of the spout assembly 300.

Figure 3A:
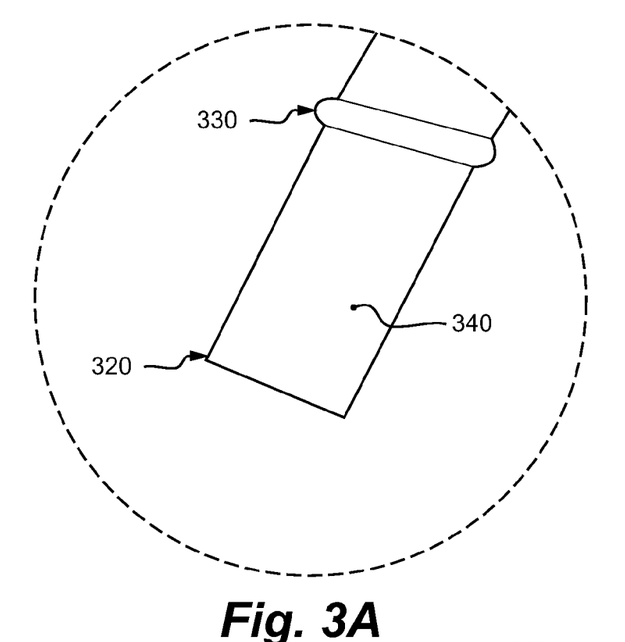
FIG. 3A illustrates an enlarged view of the area of the portion I-I of FIG. 2A.
Figure 3B:
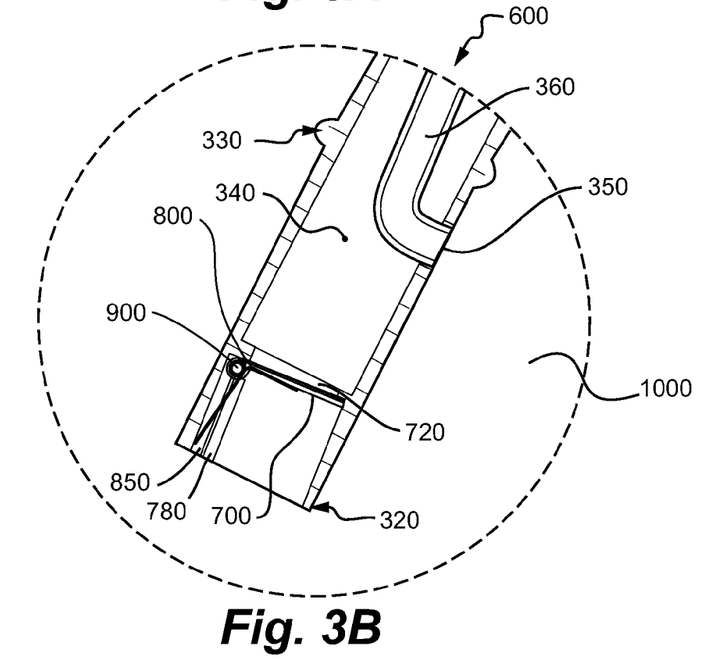
FIG. 3B illustrates an enlarged view of the area of the portion II-II of FIG. 2B.

The anti-drain valve assembly 600 comprises a vent tube 360 for connecting in fluid communication the vacuum chamber 420 with the discharge end 320 of the spout assembly 300 through the vent opening 350 located at the terminal end of the vent tube 360 as depicted in FIGS. 2B, 3B.

As described here, the nozzle 100 generally works off of pressure created by the flow of fuel F from the dispensing pump (not shown). When the operating lever 220 is engaged, the poppet valve stem 510 is open, allowing fuel F to freely flow. As the fuel F flows into a fuel tank of a vehicle or a container that is not full, the vent opening 350 of the anti-drain valve assembly 600 is unobstructed (open), which allows air to be sucked into the vacuum chamber 420 located above the poppet valve 500.

As long as the vacuum chamber 420 is in equilibrium with the atmospheric pressure beneath the diaphragm 460, the poppet valve 500 is engaged (open), and the flow of fuel F will continue. When the operating lever 200 is disengaged or when the vent opening 350 of the anti-drain valve assembly 600 is covered by fuel F (signifying a level of the fuel tank or container is full, which, in turn, releases the hold-open clip 240 as described above), air intake into the vent tube 360 ceases, the poppet valve stem 510 causes the poppet valve seat 520 to close, disrupting the flow of fuel F.

Operation of the Nozzle

During operation of the nozzle 100, the customer grabs the handhold (formed by the inlet port 130 and the handle guard 220) and presses the operating lever 200 of the main valve 160, which causes the main valve 160 to open and allows fuel F to pass through the passageway of the body 120 in the direction of the poppet valve 500. As seen in FIG. 2B, the poppet valve 500 is biased in a closed position by a spring or other compression means (not shown) such that fuel F is prevented from flowing into the spout assembly 300. As the fuel F flows through the body 120, the force of the pressure from the fuel is sufficient to overcome the compression means such that the poppet valve 500 moves in the direction of the outlet port 150, allowing fuel F to flow freely though the body 120, through the spout assembly 300, and into the fuel tank or container (not shown). Fuel F will continue to flow in this manner provided the operating lever 200 is still pressed (the customer may or may not have engaged the hold open clip 240 to allow unattended fueling) until such time as the vent opening 350 of the vent tube 360 becomes blocked, signifying the fuel level has nearly reached the top of the vehicle's fuel neck or the container. Upon reaching this condition, the automatic shut-off means 400 is activated to close the main valve 160 thereby deactivating the nozzle 100 and preventing any further fuel F from flowing to the spout 340.

Since the point of closure of the main valve 160 in a conventional nozzle is located within the body 120 of the nozzle 100, there is an area between the poppet valve 500 and the dispensing end 320 of the spout 340 where fuel F may remain after fueling (once the nozzle 100 has been deactivated). Depending on the length, the diameter, and the curvature of the spout 340, the fuel F retained in this area can vary from a few drops to several ounces. Thus, it is desirable to prevent any of this residual fuel F remaining in the body 120 and the spout 340 from dripping or leaking out of the dispensing end of the spout 320. It is to this problem that the fuel leak prevention system 1000 of the present invention is directed.

As described thus far, the nozzle 100 is conventional and is representative of nozzles of the sort used at most fueling stations. However, as mentioned, the disclosed invention has application to application to any liquids that are to be dispensed, including petrol, diesel, kerosene, gas oil, gas, liquid petroleum gas, av-gas, chemicals, and water.

Fuel Leak Prevention System

First Embodiment

Figure 4A:
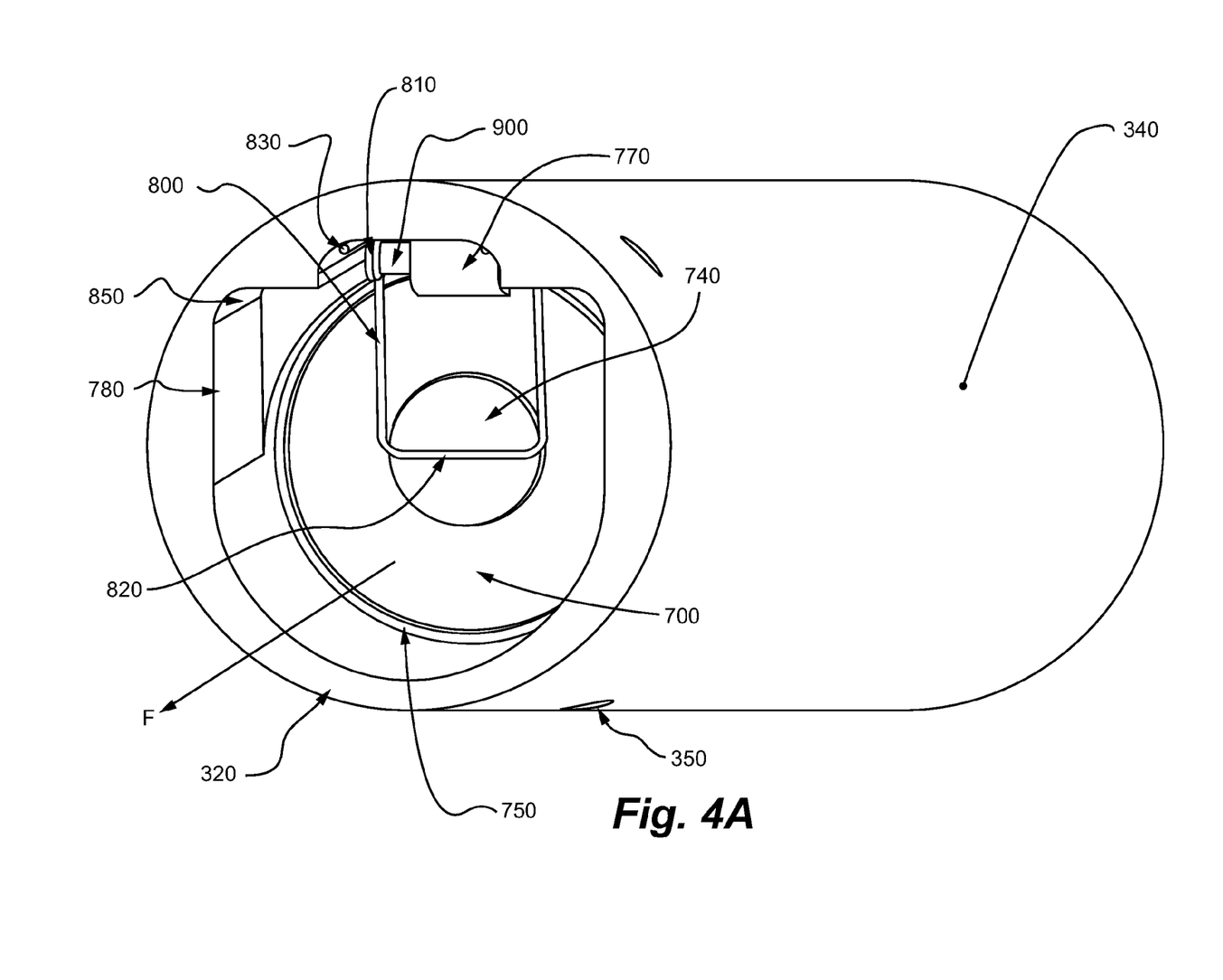
FIG. 4A illustrates a perspective view of an assembled configuration of the check valve insert inside a spout assembly in accordance with an embodiment of the present invention.
Figure 4B:
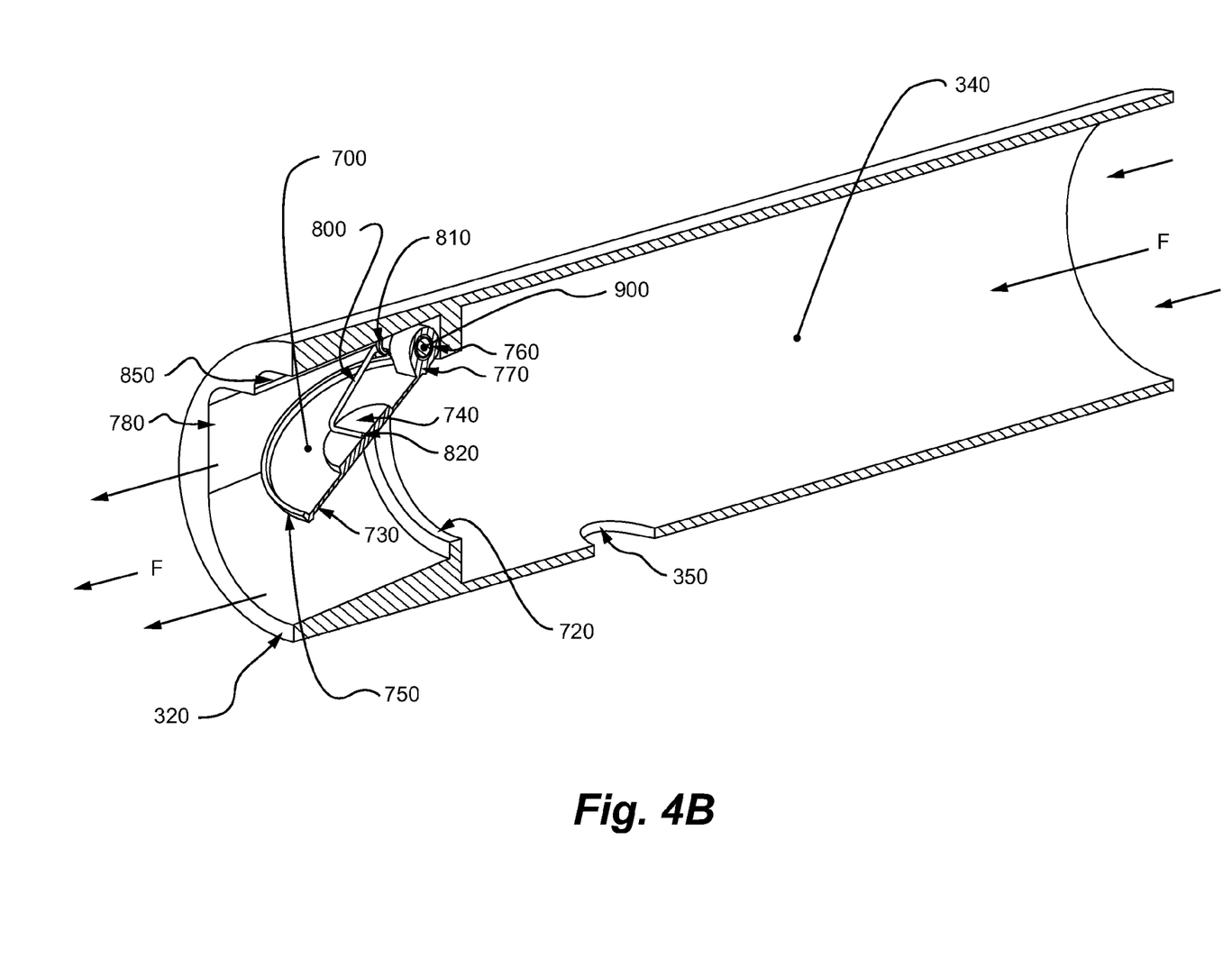
FIG. 4B illustrates a perspective cross-sectional view of the assembled configuration of FIG. 4A.

In the first exemplary embodiment of the fuel leak prevention system 1000 of the present invention, the nozzle is also conventional and operates as described thus far. The assembled system is depicted in FIGS. 4A, 4B. The fuel leak prevention system 1000 incorporates a check valve insert that comprises a flapper valve 700, a closing member, preferably a spring 800, and a hinge pin 900 combined to function as a spring-loaded pivoting flap, which can be preferably inserted into the dispensing end 320 of the spout of a fuel dispensing nozzle 100 and thus generally circular shaped so as to fit within the inner diameter of the spout 340 (FIG. 4A). The check valve insert prevents the flow of fuel F at the terminal end 320 of the spout 340. By stopping the flow of fuel F here (as opposed to at a location interior to the nozzle 100, e.g., the poppet valve stem 510 in the body 120 of the nozzle 100), there is no drippage of the fuel F that remains in the spout 340 after the nozzle 100 has been deactivated. The check valve insert is positionable at the dispensing end 320 of the spout 340, and it can be located below the vent opening 350 so as to not interfere with the function of the automatic shut-off means 400.

Flapper

The flapper valve 700 (FIG. 5A) is shaped as a circular plate so that its diameter is less than the inner diameter of the spout 340 but greater than a graduated stepped down area 720 at the end 320 of the spout 340. The stepped down area 720 is necessarily smaller in diameter than the diameter of the flapper valve 700 such that the flapper valve 700 presses flat against the radial portion of the stepped down area 720 in order to form an effective seal to prevent fuel F from leaking from the end 320 of the spout 340. The flapper valve 700 is substantially flat on one surface 730 (FIGS. 5A, 5B, 5D), the sealing surface, while the opposing surface contains a raised circular portion 740 (FIGS. 5A, 5B, 5C) that provides a localized area for the spring 800 (described later) to press against. The raised circular portion 740 is not necessary to the present invention, but can provide enhanced performance for the reason just stated.

Figure 5A:
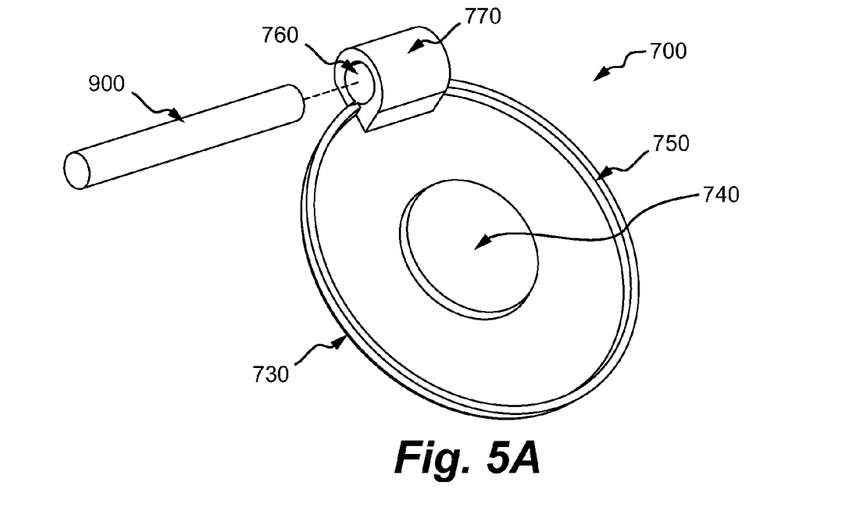
FIG. 5A illustrates a perspective view of the flapper valve and depicting the insertion of the hinge pin in accordance with an embodiment of the present invention.
Figure 5B:
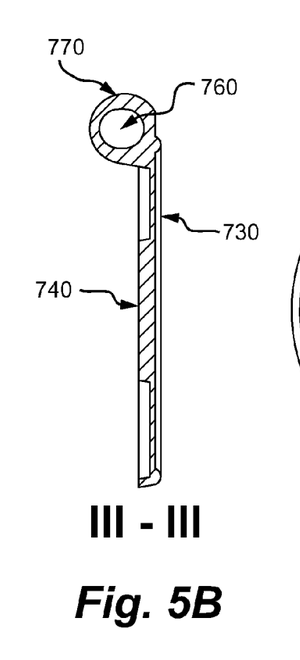
FIG. 5B illustrates a cross-sectional view of the flapper valve as seen along the section III-III of FIG. 5C in accordance with an embodiment of the present invention.
Figure 5C:
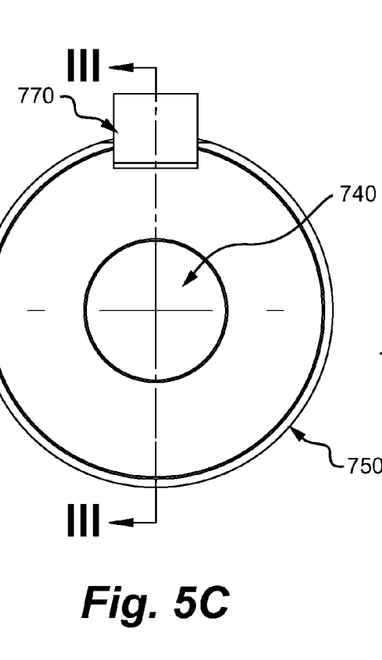
FIGS. 5C and 5D illustrate front and side views of the flapper valve in accordance with an embodiment of the present invention.
Figure 5D:
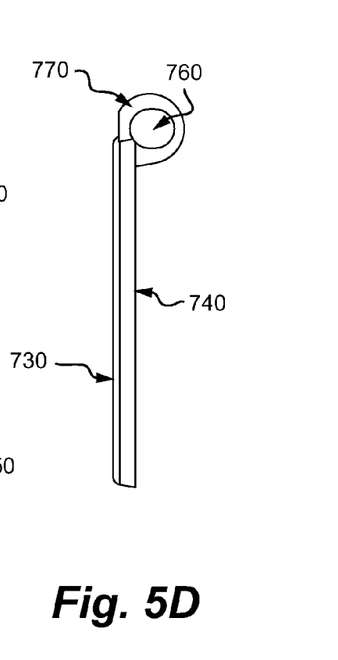

The flapper valve 700 is preferably made of an elastomeric material, such as Viton, to prevent leakage around the periphery 750 of the flapper valve 700, prevent seepage through the flapper valve 700, and to minimize the effects of thermal expansion. However, the flapper valve 700 can also be made of any suitable similar material or even metal. The thickness of the flapper valve 700 need only be sufficient to provide adequate structural stability during operation.

The flapper valve 700 also contains a tab 770 located at its top, the tab 770 comprising an aperture 760 centered along its longitudinal axis to accept a hinge pin 900 (described below) and being configured for adaptation into a groove or cutout section 850 located at the inner wall 780 of the spout 340 (FIG. 4B). The tab 770 is pivotably attached to the groove 850, for example by means of the hinge pin 900 that can be inserted into the aperture 760 and that extends along an axis parallel to the inner 730 and outer 740 faces of the flapper valve 700. When the hinge pin 900 is secured to the inner wall 780 of the spout 340 (as described below), the flapper valve 700 is free to rotate within the spout 340 about the longitudinal axis of the hinge pin 900 as described above.

Hinge Pin

The hinge pin 900 of the check valve insert (shown schematically in FIGS. 5A and 6A, and in the assembled configuration in FIG. 4B) is a conventional cylindrically shaped pin member sized such that its diameter allows it to be inserted into the aperture 760 with sufficient clearance for the flapper valve 700 to freely rotate within the spout 340 about the longitudinal axis of the aperture 760. Other means of securing the flapper valve 700 within the spout 340 are certainly possible, and the embodiments shown here should not be considered limiting to the scope of the present invention.

Spring

Figure 6A:
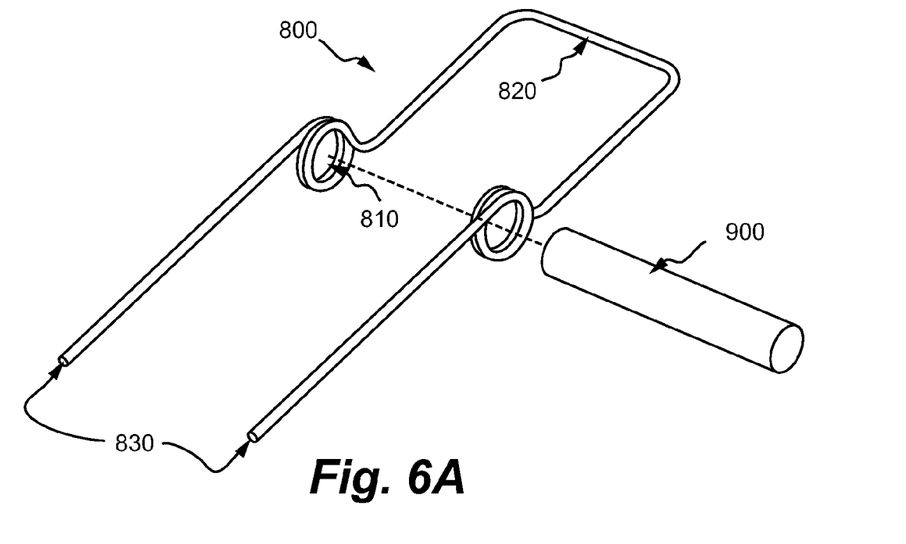
FIG. 6A illustrates a perspective view of the spring member and depicting the insertion of the hinge pin in accordance with an embodiment of the present invention.
Figure 6B:
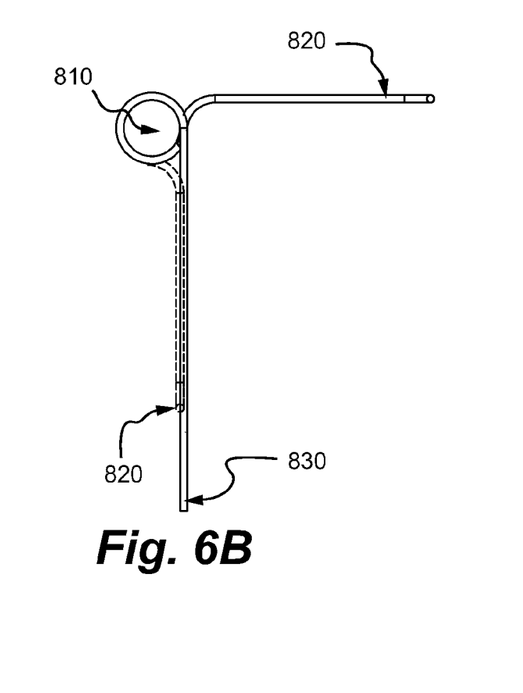
FIG. 6B illustrates a side view of the spring member, shown in both the nominal (closed) and fully open positions in accordance with an embodiment of the present invention.
Figure 6C:
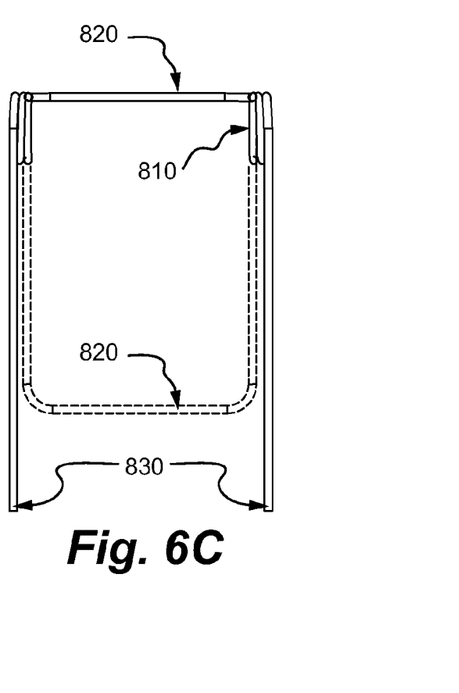
FIG. 6C illustrates a front view of the spring member, shown in both the nominal (closed) and fully open positions in accordance with an embodiment of the present invention.

An embodiment of the closing member 800 is depicted as a spring element for adaptation into the check valve insert (FIGS. 4B, 6A, 6B, 6C). As shown here, the spring 800 consists of a u-shaped wound wire material, such as that formed around a circular mandrel (not shown) to provide a circular portion 810 that is sized to fit onto the hinge pin 900, and opposing ends 820 and 830. In its "normal" position, the spring is configured as shown in FIG. 6B such that the flapper valve remains in the closed position due to the force of the spring 800 against the raised circular portion 740. That is, the spring 800 and flapper valve 700 configuration are predisposed such that the flapper valve 700 is pressed against the graduated section 720 of the spout 340 by the spring force to prevent the flow of fuel F when the nozzle 100 is not activated (i.e., there is no fuel flowing and consequently no pressure build up to force open the flapper valve). When the user presses the lever 200 to open the main valve 160, the flapper valve 700 is activated (opened) by the pressure created by the flow of fuel F from the pump as described above. This is represented by the dashed lines in FIGS. 6B and 6C. When the flow of fuel F stops (i.e., the user releases the lever 200 or the automatic shut off means 400 is activated as described above), the flapper valve 700 closes due to the spring force 800 since the resistant pressure in the spout 340 is not enough to maintain the flapper valve 700 in the open position. Consequently, remaining fuel F in the nozzle 100 is retained in the spout 340.

The opposing ends 820, 830 of the spring 800 perform different functions. The closed end of the spring 820 is configured such that it uniformly presses against the raised circular portion 740 of the flapper valve 700. This feature of the flapper valve 700 is not essential to its performance, but it provides enhanced performance, especially when the flapper valve 700 is in the nominal (closed) position because it allows for the spring force to be more effectively transferred across the sealing face 730 of the flapper valve 700 to improve the seal at the interface with the graduated section 720 of the spout 340.

The open ends 830 of the spring are similarly configured such that the spring 800 can be inserted into the inner wall 780 of the dispensing end 320 of the spout 340 by means of the cutout or groove 850 at a bottom portion of the inner wall 780 of the spout 340, the groove 850 being sized and positioned to accept the tab 770 at the top of the flapper valve 700 such that the flapper valve 700 can freely rotate within the spout 340 about the axis of the hinge pin 800 (as described above) as it moves from its nominal (closed) position to its open position. Positioning the tab 770 so that it is partially located within the inner wall 780 (in the groove 850) raises the axis about which the flapper valve 700 rotates within the spout 340. This provides additional clearance for the flapper valve 700 to rotate within the spout 340 when the nozzle 100 is operational and thereby minimizes the effects of the check valve on the flow rate. The width of the spring 800 (the lateral distance between the two single pieces of wire 820 at the open end of the spring) is sized to securely fit into the groove 850 to minimize the lateral motion of the flapper valve 700 within the spout 340. Other means for closing the flapper valve 700 are possible, for example, the closing member 800 could incorporate a piston or actuator of some sort.

The check valve insert of the present invention is positionable at the outlet end 320 of the nozzle 100, below the vent opening 350, so it does not interfere with the automatic shut-off means 400 (venturi system) to automatically shut off the main valve 160 when the tank or container is full of fuel.

Manufacturing Considerations

The embodiments of the fuel leak prevention system 1000 and check valve insert of the present invention are preferably incorporated into the standard spout 340 for a fuel dispensing nozzle 100 in a manner well understood, for example, by means of a dye cut during manufacturing of the nozzle components. In particular, the spout 340 of the nozzle 100 as described here can be manufactured to incorporate the groove 850 and the graduated section 720 to accept the spring-loaded pivoting flap that comprises the hinge pin 900, the flapper valve 700, and the spring member 800. In this manner, a nozzle 100 can be manufactured to incorporate the check valve of the present invention without the need to retrofit or replace any section of the nozzle 100. On the other hand, if desired, the filling station owner can replace the entirety of the nozzle 100 by, for example, breaking the connection 145 between the hose 140 (as schematically depicted in FIGS. 1, 2A, 2B) and the inlet port 130 of the body 120 and then inserting a new nozzle 100 that incorporates the check valve insert as described here.

Fuel Leak Prevention System

Second Embodiment

In another exemplary embodiment of the fuel leak prevention system 1000 of the present invention, the nozzle 100 is also conventional and operates as described thus far. However, to allow existing nozzles to be retrofitted or refurbished, without replacement, the check valve insert can be a tabular insert or it can be press fit into the end 320 of the spout 340.

Also, a removable spout extension 980 that is not provided to the nozzle 100 during manufacturing can be added to an existing nozzle 100 as described below. The spout extension 980 would preferably have a cross-section and external dimensions similar to that of the existing spout 340 so that the outer end 985 of the spout extension 980 can be easily inserted into a fill pipe of a fuel tank or storage container.

Figure 7A:
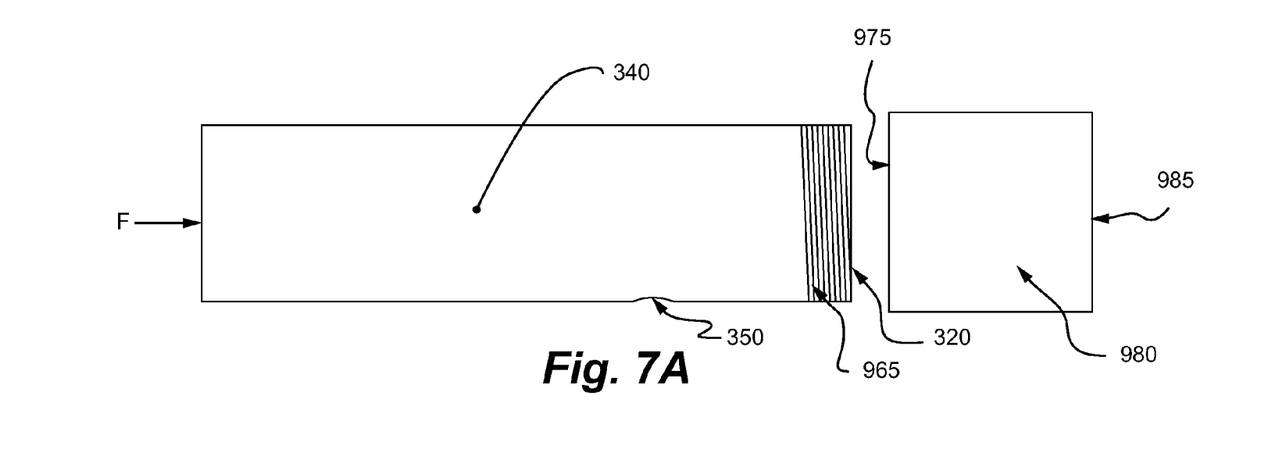
FIG. 7 illustrates a side view of a spot extension for attachment to the spout of a fuel dispensing nozzle in accordance with an alternate embodiment of the present invention.
Figure 7B:
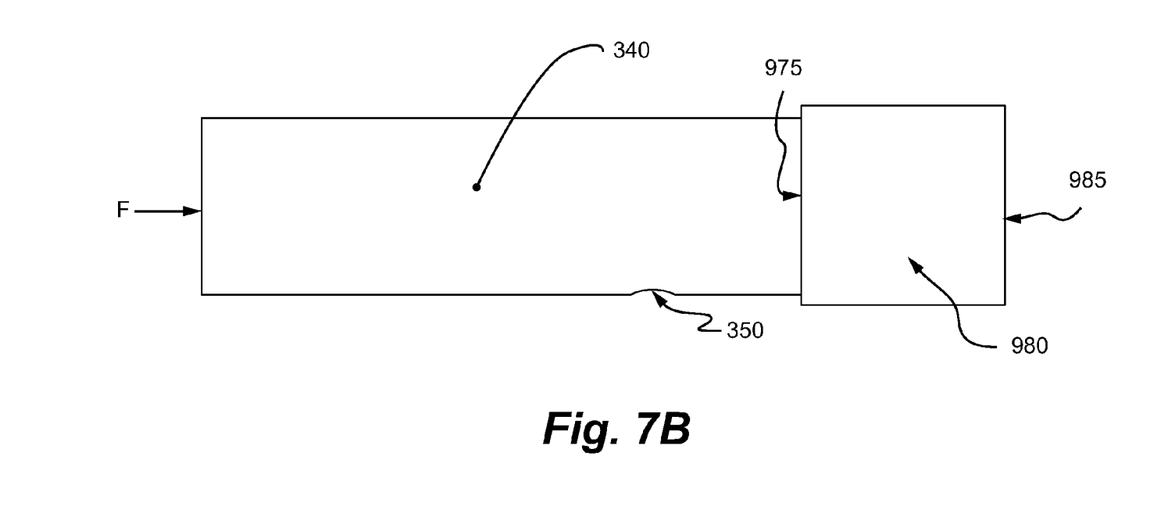

In this embodiment, the check valve insert of the present invention can be inserted into the outer end 985 of the spout extension 980 in a manner similar to that described above, and then the spout extension 980 can be attached at its opposing end 975 to the outer end 320 of the spout 340 using conventional mechanical attachment that can provide a secure seal to prevent seeping of fuel F at the attachment point, including threaded means (e.g., like the silencer on a handgun), solvent resistant epoxy, set screws, compression fittings, self-cutting teeth, or the like. For example, this is depicted in FIG. 7 wherein the outer end 320 of the spout 340 of an existing nozzle 100 is depicted as having external screw threads 965 such that the spout extension 980, which in this example would have internal screw treads (not shown), can mate with the outer end 320 of the spout 340. In this embodiment, the spout extension 980 is generally cylindrically shaped, much like the shape of the spout 340 itself, and it is adapted for attachment to the outer end 320 of the spout 340 in such a manner so as to avoid interruption of the automatic shut off means 400 (i.e., by not covering the vent opening 350). All other functions of the components of the check valve insert, namely, the flapper 700, the closing member (spring) 800, the hinge pin 900, and the stop member 720, and their operation within the spout extension 980 remain the same as described above in connection with the first embodiment of the present invention.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A leak prevention system for use with a liquid dispensing nozzle, the nozzle in fluid communication with a liquid dispensing pump, the system comprising:
    a body portion;
    a spout assembly extending from the body portion, the spout assembly having an outlet end configured for dispensing the liquid;
    a flow control valve in the body portion operable to allow or prevent the flow of liquid through a flow passage defined by the body portion; and
    a check valve comprising:
        a flap member pivotably attached within the spout assembly; and
        a closing member mounted within the spout assembly and oriented to engage the flap member to apply a continuous force to a rear face of the flap member;
    the check valve positioned within the spout assembly and downstream of the flow control valve and being responsive to the flow of liquid through the body portion and into the spout assembly; and wherein the check valve is biasedly disposed to remain closed when no liquid is flowing through the nozzle so as to prevent liquid from dripping from the outlet end when the nozzle is not activated.

2. The system of claim 1, wherein the check valve is located in the vicinity of the outlet end of the spout assembly.

3. The system of claim 1, wherein
the force applied by the closing member is large enough to cause an opposing face of the flap member to seat in the spout assembly and remain seated when the nozzle is not activated, but the force is not so large to prevent the flap member from rotating to substantially open the spout assembly and allow the flow of liquid when the nozzle is activated.

4. The system of claim 1, wherein the closing member is a spring.

5. The system of claim 1, further comprising a stop member positioned inside the spout assembly and adapted to provide a seating area for the opposing face of the flap member and for preventing the flap member from rotating beyond a preset orientation.

6. The system of claim 1, wherein the flap member is substantially round.

7. The system of claim 4, wherein the spring is a torsion spring.

8. A leak prevention system for use with a liquid dispensing nozzle, the nozzle in fluid communication with a liquid dispensing pump, the system comprising:
    a body portion;
    a spout assembly extending from the body portion, the spout assembly having an outlet end configured for dispensing the liquid;
    a flow control valve in the body portion operable to allow or prevent the flow of liquid through a flow passage defined by the body portion; and
    a check valve comprising:
        a hinge pin secured inside the outer end of the spout assembly;
        a flap member being pivotably attached within the spout assembly, the flap member comprising a tab located at an outer edge of the flap member, the tab having a bore through a longitudinal axis of the tab and configured to receive the hinge pin such that the flap member can rotate about the longitudinal axis; and
        a spring mounted within the spout assembly and oriented to engage the flap member to apply a continuous force to a rear face of the flap member, the spring also configured to receive the hinge pin such that the spring is in constant communication with the flap member;
    the check valve positioned within the spout assembly and downstream of the flow control valve and being responsive to the flow of liquid through the body portion and into the spout assembly;
    wherein the force applied by the spring is large enough to cause an opposing face of the flap member to seat in the spout assembly and remain seated when the nozzle is not activated, but the force is not so large to prevent the flap member from rotating to substantially open the spout assembly and allow the flow of liquid when the nozzle is activated; and
    wherein the check valve is biasedly disposed to remain closed when no liquid is flowing through the nozzle so as to prevent liquid from dripping from the outlet end when the nozzle is not activated.

9. The system of claim 8, wherein the hinge pin is fixedly attached to an inner wall of the spout assembly; and
wherein the inner wall contains a groove adapted to receive an upper surface of the tab and at least a portion of the spring such that the axis of rotation of the flap member is partially located within the inner wall to allow the flap member to rotate within the spout assembly and fully seat against the stop member without interference from the inner wall.

10. The system of claim 8, wherein the flap member is constructed of metal.

11. The system of claim 8, wherein the flap member is constructed of an elastomeric material.

12. The system of claim 8, wherein the rear face of the flap member further comprises a raised portion centrally located and configured to receive the closing member so as to distribute the closing member force across the flap member.

13. The system of claim 8, wherein the check valve is located below a vent opening of the spout assembly.

14. The system of claim 8, wherein the spring is a torsion spring.

15. A leak prevention system for use with a liquid dispensing nozzle, the nozzle being in fluid communication with a liquid dispensing pump and including a body portion, a spout assembly extending from the body portion, the spout assembly having an outlet end configured for dispensing the liquid, and a flow control valve in the body portion operable to allow or prevent the flow of liquid through a flow passage defined by the body portion, the system comprising:
    a spout extension configured to be fixedly attached to the outlet end of the spout assembly and having an outlet end configured for dispensing the liquid; and
    a check valve comprising:
        a hinge pin secured inside the outer end of the spout extension;
        a flap member being pivotably attached within the spout extension, the flap member comprising a tab located at an outer edge of the flap member, the tab having a bore through a longitudinal axis of the tab and configured to receive the hinge pin such that the flap member can rotate about the longitudinal axis; and
        a spring mounted within the spout extension and oriented to engage the flap member to apply a continuous force to a rear face of the flap member, the spring also configured to receive the hinge pin such that the spring is in constant communication with the flap member;
    the check valve positioned within the spout extension and being responsive to the flow of fuel through the body portion and into the spout assembly and the spout extension;
    wherein the force applied by the spring is large enough to cause an opposing face of the flap member to seat in the spout extension and remain seated when the nozzle is not activated, but the force is not so large to prevent the flap member from rotating to substantially open the spout extension and allow the flow of liquid when the nozzle is activated; and
    wherein the check valve is biasedly disposed to remain closed when no fuel is flowing through the nozzle so as to prevent liquid from dripping from the outlet end of the spout extension when the nozzle is not activated.

16. The system of claim 15, wherein the check valve is located in the vicinity of the outlet end of the spout extension.

17. The system of claim 15, further comprising a stop member positioned inside the spout extension and adapted to provide a seating area for the opposing face of the flap member and for preventing the flap member from rotating beyond a preset orientation.

18. The system of claim 15, wherein the hinge pin is fixedly attached to an inner wall of the spout extension; and
wherein the inner wall contains a groove adapted to receive an upper surface of the tab and at least a portion of the spring such that the axis of rotation of the flap member is partially located within the inner wall to allow the flap member to rotate within the spout extension and fully seat against the stop member without interference from the inner wall.

19. The system of claim 15, wherein the rear face of the flap member further comprises a raised portion centrally located and configured to receive the closing member so as to distribute the closing member spring force across the flap member.

20. The system of claim 15, wherein the spout extension does not cover a vent opening of the spout assembly.

* * * * *